US012244373B2

(12) United States Patent
Sur et al.

(10) Patent No.: US 12,244,373 B2
(45) Date of Patent: Mar. 4, 2025

(54) HEAT DISSIPATION FOR MILLIMETER-WAVE DEVICES WITH ANTENNA SWITCHING

(71) Applicant: University of South Carolina, Columbia, SC (US)

(72) Inventors: Sanjib Sur, Cayce, SC (US); Moh. S. Saadat, West Columbia, SC (US); Srihari Nelakuditi, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 18/166,555

(22) Filed: Feb. 9, 2023

(65) Prior Publication Data
US 2023/0198587 A1 Jun. 22, 2023

Related U.S. Application Data

(63) Continuation of application No. 17/327,881, filed on May 24, 2021, now Pat. No. 11,588,526.

(60) Provisional application No. 63/055,386, filed on Jul. 23, 2020.

(51) Int. Cl.
H04B 7/06 (2006.01)
H04W 52/02 (2009.01)

(52) U.S. Cl.
CPC ......... H04B 7/0608 (2013.01); H04B 7/0693 (2013.01); H04W 52/0277 (2013.01)

(58) Field of Classification Search
CPC .. H04B 7/0608; H04B 7/0693; H04B 7/0814; H04W 52/0277; H04W 52/0245
See application file for complete search history.

(56) References Cited

U.S. PATENT DOCUMENTS

| | | | |
|---|---|---|---|
| 11,588,526 B2* | 2/2023 | Sur | H04B 7/0814 |
| 2008/0237358 A1* | 10/2008 | Shibamoto | H01Q 7/00 235/492 |
| 2019/0069304 A1* | 2/2019 | Chang | H04B 17/318 |
| 2019/0137646 A1* | 5/2019 | Frey | G01V 3/12 |
| 2020/0220572 A1* | 7/2020 | Kwon | H04M 1/026 |
| 2021/0091448 A1* | 3/2021 | Kang | H01Q 1/242 |
| 2021/0105046 A1* | 4/2021 | Gutman | H04B 7/0874 |
| 2021/0306866 A1* | 9/2021 | Zewail | H04W 72/23 |
| 2022/0167865 A1* | 6/2022 | Tofighi | A61B 5/0507 |

* cited by examiner

Primary Examiner — Christine Ng
(74) Attorney, Agent, or Firm — Offit Kurman; Douglas Lineberry

(57) ABSTRACT

Described herein are systems, methods and devices for implementing a temperature-aware, multi-antenna scheduler that cools mmWave devices by preventing heat buildup via switching or distributing a data stream to other redundant antennas, allowing for dissipation of heat as well as providing reliable connectivity.

21 Claims, 13 Drawing Sheets

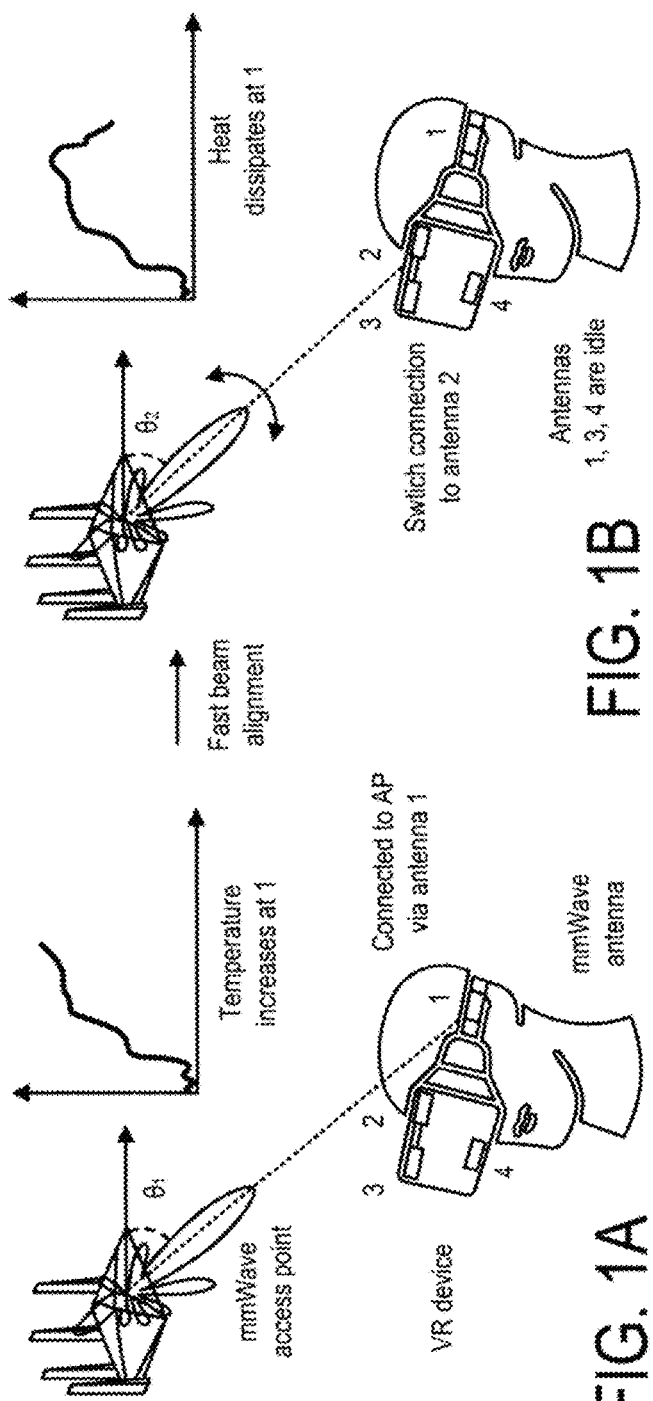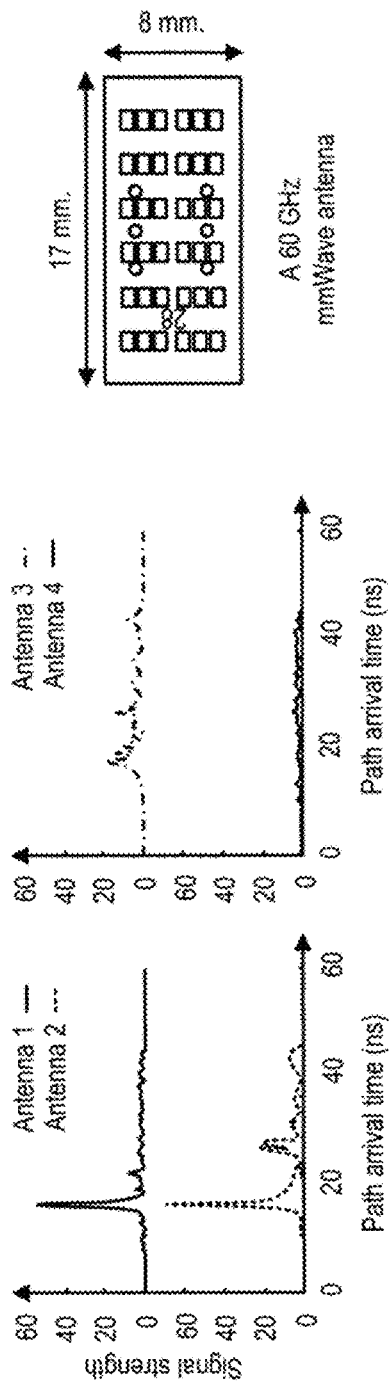

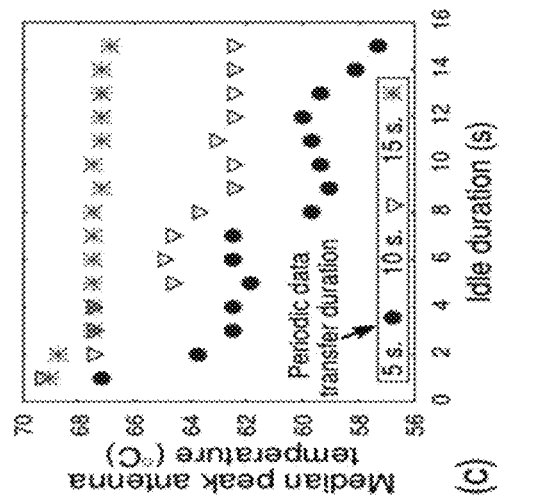
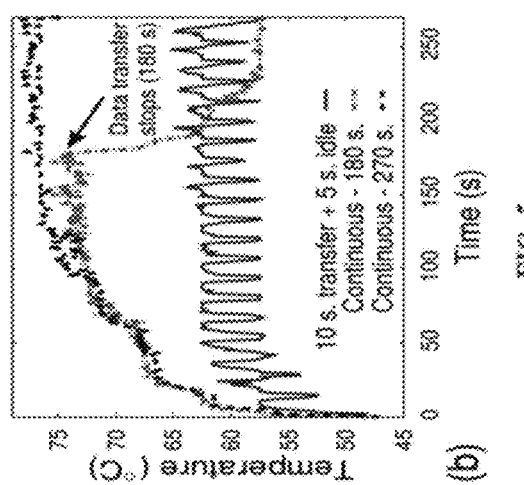
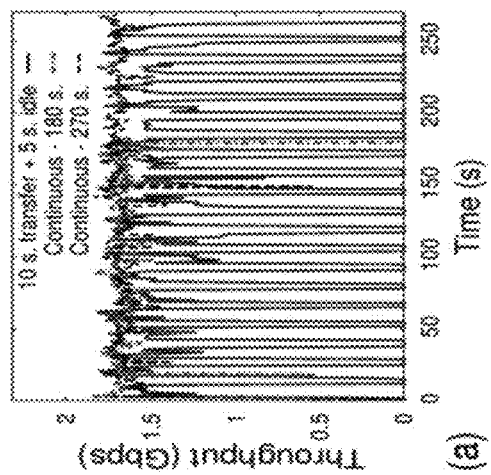
FIG. 5

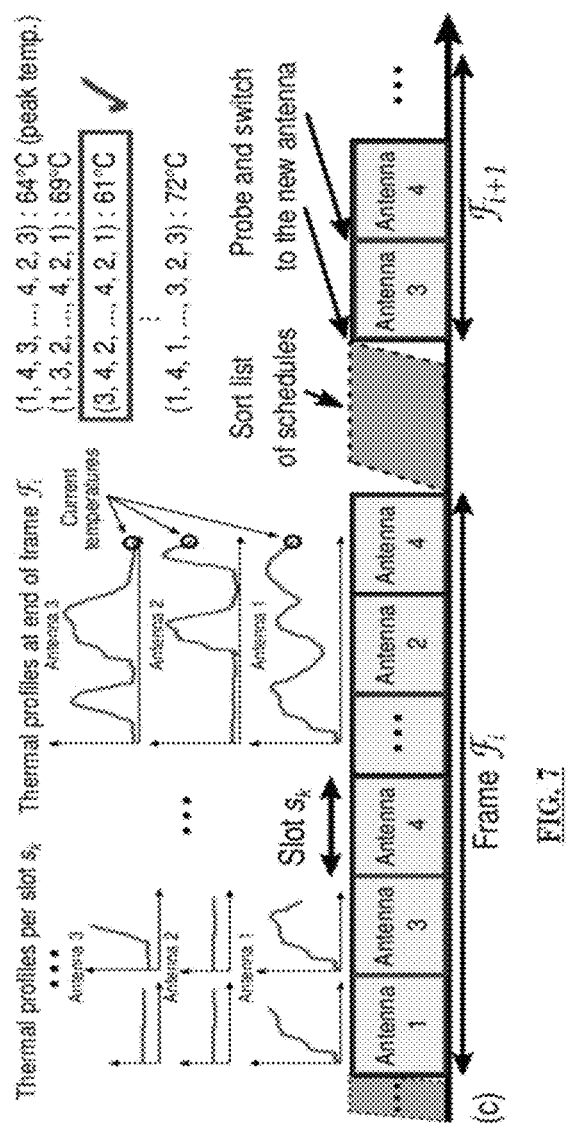
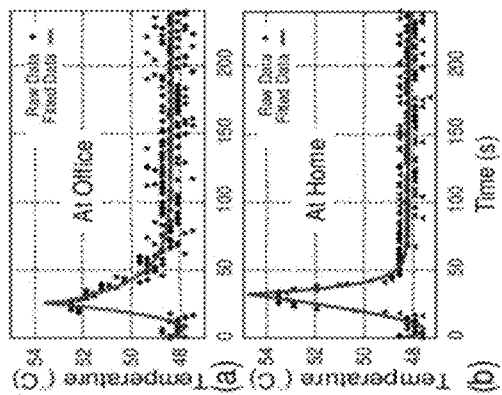
FIG. 7

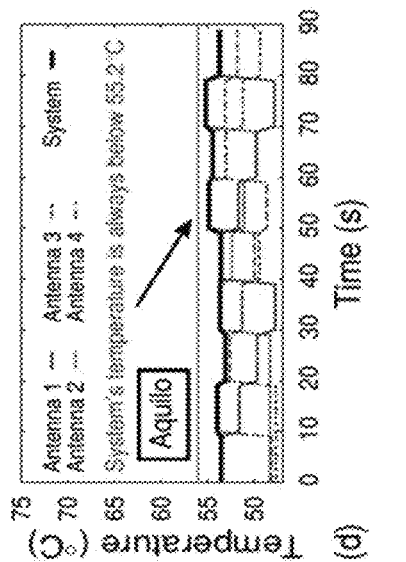
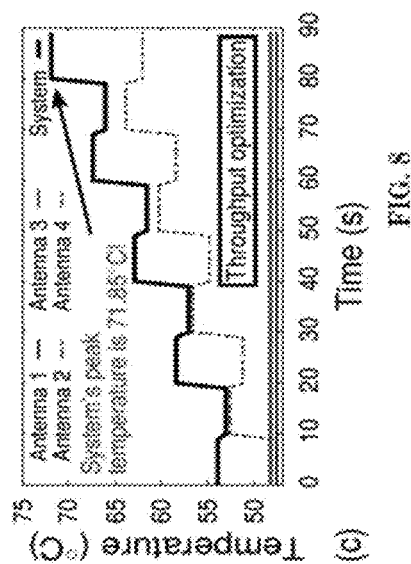
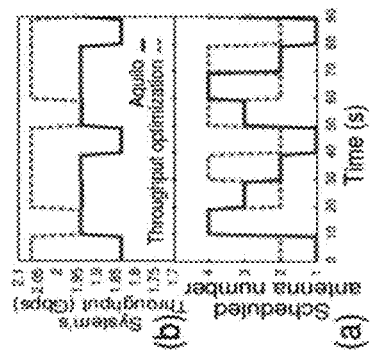
FIG. 8

Algorithm 1 *Antenna Scheduling*

1: For every frame, $\mathcal{F}_i$; Input: Thermal profiles $Th_k^{(i-1)}$ for all antennas $k$ in $\mathcal{F}_{i-1}$; Output: New thermal profile $Th_k^i$;
2: For every schedules, $s_j = \{a_1, a_2, a_3, \ldots, a_\eta\}\ \forall j$
3:     $PT_{s_j} \leftarrow max\{PT(a_1), \ldots, PT(a_\eta)\}$; $PT$: Peak Temp.;
4: endFor
5: Sorted list of schedules: $S = \{s_1, s_2, s_3, \ldots, s_N\}$, s.t., $PT_{s_1} \leq PT_{s_2} \leq \ldots \leq PT_{s_N}$;
6: Initialize the current schedule: $\alpha_i = \{\}$;
7: For each slot, $k \in \{1, \ldots, \eta\}$
8:     Scheduled antenna, $SA \leftarrow s_1(a_k)$; $link \leftarrow probe(SA)$;
9:     while $link$ is *false*
10:       Remove all $s_j$ which starts with antenna $SA$; $S \leftarrow S \setminus s_j,\ \forall s_j,\ s.t.,\ SA = s_j(a_k)$;
11:       $SA \leftarrow s_1(a_k)$; $link \leftarrow probe(SA)$;
12:     endwhile
13:     $\alpha_i \leftarrow \{\alpha_i | SA\}$; $switch(SA)$;
14:     Update thermal profile for $SA$: $Th_{SA}^i$;
15: endFor

FIG. 13

HEAT DISSIPATION FOR MILLIMETER-WAVE DEVICES WITH ANTENNA SWITCHING

STATEMENT REGARDING FEDERALLY SPONSORED RESEARCH

This invention was made with government support under 1910853 awarded by National Science Foundation. The government has certain rights in the invention.

TECHNICAL FIELD

The subject matter disclosed herein is generally directed to systems, methods and devices for implementing a temperature-aware, multi-antenna scheduler that cools mmWave devices by preventing heat buildup via switching or distributing a data stream to other redundant antennas, allowing for dissipation of heat as well as providing reliable connectivity.

BACKGROUND

The explosive demand for mobile broadband globally has created significant stress on the existing wireless infrastructure. Millimeter-wave (mmWave) has emerged as the core, new technology for the next-generation wireless LAN and cellular standards: IEEE 802.11ad; IEEE 802.11ay; and 5G NR. MmWave systems are the key enabler for applications that demand multiple Gbps throughput and ultra-low latency connectivity including immersive virtual and mixed reality, tactile internet, telesurgery, control for smart infrastructures, and autonomous vehicle safety. MmWave systems achieve these capabilities by operating at a very high frequency and ultra-wide bandwidth, on the order of multiple GHz.

Such a high operational regime, however, brings unique challenges: Compared to the micro-wave devices, like Wi-Fi, the mmWave devices consume more energy, dissipate more power, and, subsequently, heat up faster. Increase in device temperature not only affects the hardware, but also is disconcerting to the users, especially when devices are small, hand-held, body-worn, and near the face and brain. Device overheating is a common concern of many users, and mm Wave would exacerbate the problem further. Thus, investigating ways to mitigate thermal inefficiencies in mmWave devices is of vital importance.

The current disclosure's research shows that preliminary measurements reveal that after only 10 s. of data transfer at 1.9 Gbps bit-rate, the mm Wave antenna temperature reaches 68° C.; it reduces the link throughput by 21%, increases the standard deviation of throughput by 6×, and takes 130 s. to dissipate the heat completely.

While existing research and products have characterized and solved challenges in mmWave channel, link, network, and applications, none have looked at minimizing the system-level temperature of active mmWave antennas. Accordingly, it is an object of the present disclosure to provide devices, systems and methods for mitigating thermal inefficiencies in mmWave devices.

Citation or identification of any document in this application is not an admission that such a document is available as prior art to the present disclosure.

SUMMARY

The above objectives are accomplished according to the present disclosure by providing in a first embodiment a temperature-aware multi-antenna scheduler. The schedule may include at least two antennae capable of receiving a data stream, a preset heat level proscribed for each antenna, the scheduler may switch the data stream from the first antenna to another antenna, when the first antenna reaches a preset heat level, and when the data stream is removed from the first antenna, the first antenna dissipates heat. Further, the data stream is switched from the another antenna to a subsequent antenna. Still, subsequent switching of the data stream among antennas may return the data stream to the first antenna. Moreover, the scheduler may analyze near-past observation of thermal profiles for the at least two antennae to determine which antenna should receive the data stream upon switching. Further, the schedule may include at least one thermal probe. Yet further, an antennae not receiving the data stream may remain idle. Still yet, a thermal-profile may be established for each antennae. Further still, the thermal-profile of each antenna may be modeled as two exponentials: exponential gain, $e^{\alpha \cdot t}$, in an active state; and exponential fall, $e^{-\beta \cdot t}$, in an idle state. Again yet, the thermal profile may indicate a likelihood and change of each antenna's temperature. Still again, the scheduler may invoke a fast beam alignment protocol to select an available antenna to receive the data stream wherein the antenna has an expected performance requirement. Further yet, a non-adjacency criteria may be employed so that no antenna is scheduled for back-to-back receipt of the data stream. Yet more, Algorithm 1 may determine an antenna scheduling process. Further still, the schedule may be used in virtual and mixed reality, tactile internet, telesurgery, control for smart infrastructures, and/or autonomous vehicle applications.

In a further embodiment, a method for cooling a mmWave device is provided. The method may include forming a plurality of antennae, each capable of receiving a data stream, determining when heat in a first antenna reaches a preset heat level, switching a data stream from a first antenna to a redundant antenna, when the preset heat level is reached, and switching the data stream from the first antenna may result in the first antenna dissipating heat. Further, the method may switch the data stream from the another antenna to a subsequent antenna. Yet again, switching the data stream among antennas may return the data stream to the first antenna. Still yet, the method may include analyzing near-past observation of thermal profiles for the at least two antennae to determine which antenna should receive the data stream upon switching. The method may cause antennae not receiving the data stream to remain idle. Yet still, the method may establish a thermal-profile for each antennae. Yet again, the method may model the thermal-profile of each antenna as two exponentials: exponential gain, $e^{-\alpha \cdot t}$, in an active state; and exponential fall, $e^{-\beta \cdot t}$, in an idle state. Yet again further, the method may predict via the thermal profile a likelihood and change of each antenna's temperature. Moreover, the method may invoke a fast beam alignment protocol to select an available antenna to receive the data stream wherein the antenna has an expected performance requirement. Still more, the method may employ a non-adjacency criteria so that no antenna is scheduled for back-to-back receipt of the data stream. Again further, the method may determine via Algorithm 1 an antenna scheduling process. Still even further, the method may be applied in virtual and mixed reality, tactile internet, telesurgery, control for smart infrastructures, and/or autonomous vehicle applications.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 4 shows link performance is affected by higher antenna temperature and at: (a) link RSS is stable, but throughput fluctuates over time; (b) average throughput; and (c) standard deviation of throughput.

FIG. 5 shows under three data transfer modes: (a) Throughput of the millimeter-wave link; and (b) Temperature profiles of the antenna. (c) Effect of various idle durations on antenna's peak temperature.

FIG. 7 shows data transfer for 10 s., and then, heat dissipation: (a) at office; and (b) at home; and (c) AQUILO schedules antennas at the beginning of every frame $\mathcal{F}_i$; then, probes and switches to a new antenna every slot Sk.

FIG. 8 shows example results for a near-static 90 s. of data transfer under AQUILO and throughput optimization at: (a) scheduled antenna numbers; (b) system's throughput; and (c-d) temperature changes over time.

FIG. 13 shows Algorithm 1.

Figures 2A, 2B, 2C, 2D:
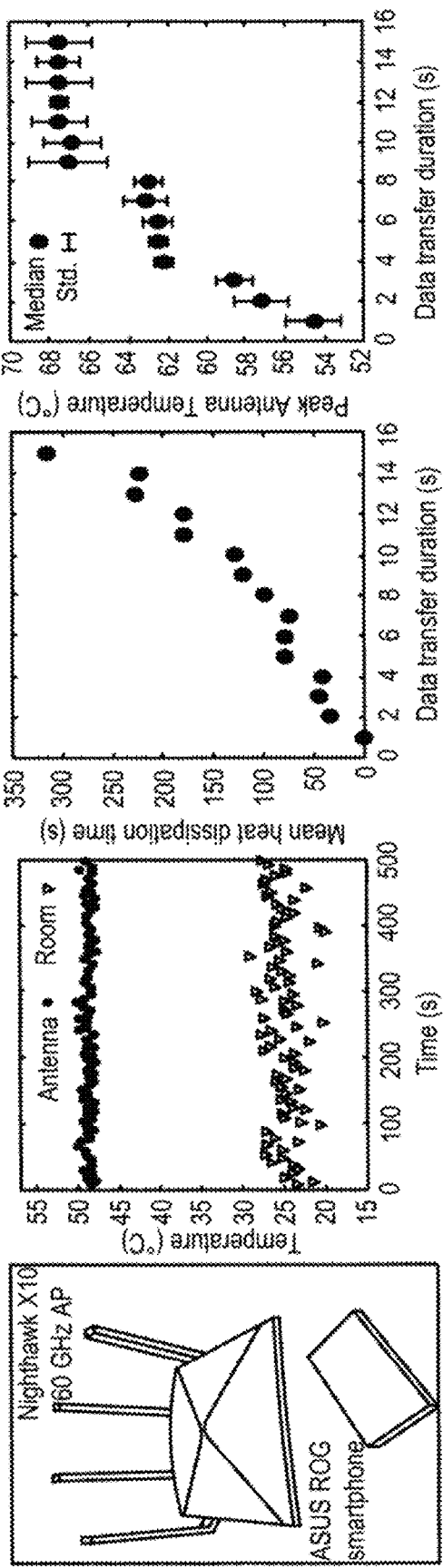
FIG. 2 shows at: (a) millimeter-wave access point (AP) and a smartphone; (b) the temperature of the room and the millimeter-wave antenna at idle state; (c) mean heat dissipation time; and (d) peak antenna temperature.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about x to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Millimeter-wave is the core technology to enable multi-Gbps throughput and ultra-low latency wireless connectivity. But the devices need to operate at very high frequency and ultra wide bandwidth; so, they consume more energy, dissipate more power, and subsequently heat up faster. Device overheating is a common concern of many users, and millimeter-wave (mmWave) would exacerbate the problem.

Here, the current disclosure analyzes the thermal characterization of mm Wave devices. Our measurements reveal that after only 10 s. of data transfer at 1.9 Gbps bitrate, the mmWave antenna temperature reaches 68° C.; reduces the link throughput by 21%, increases the standard deviation of throughput by 6, and takes 130 s. to dissipate the heat completely. Besides degrading the user experience, exposure to high device temperature also creates discomfort.

Based on the measurement insights, the current disclosure proposes AQUILO, a temperature-aware multi-antenna scheduler; it maintains relatively high throughput performance, but cools down the devices substantially. Our testbed experiments in both static and mobile conditions show that AQUILO reaches a median peak temperature just 0.5 to 2 C above the optimal by sacrificing less than 10% of throughput.

Existing research works have extensively characterized mmWave channel, link, network, and applications; however, the thermal characteristics of the mmWave device are relatively less understood. Compared to the micro-wave devices, mmWave devices operate at a very high frequency and ultra-wide bandwidth; thus, each hardware component, e.g., baseband, ADC/DACs, PLLs, mixers, power amplifiers, etc., consumes more energy and dissipate more power. Although mm Wave devices are more energy-efficient (consume less energy per bit) than Wi-Fi or LTE, higher aggregate energy consumption and power dissipation can heat the mmWave devices quicker. While existing works have looked into the power consumption of the commercial mm Wave devices to the best of our knowledge, none has looked at the thermal characteristics of the mmWave devices.

To this end, the current disclosure first characterized the thermal profile of a Commercial-Of-The-Shelf (COTS) 60 GHz mmWave smartphone under various device states and environmental conditions. Our measurements reveal that after only 10 s. of data transfer, at room temperature, with 1.9 Gbps bit-rate, the mmWave antenna temperature reaches up to 68° C.; it reduces the average link throughput by more than 21%, increases the standard deviation of throughput by 6×, and takes about 130 s. to dissipate the heat completely. Such excessive temperature of 5G NR devices is also reported by consumers of different devices and brands. Besides degrading the user experience, an increase in device temperature is disconcerting. More importantly, exposure to a high temperature may not only create short-term discomfort, but also has long-term adverse health effects. See, A. Keykhosravi and M. Neamatshahi and R. Mahmoodi and E. Navipour, "Radiation Effects of Mobile Phones and Tablets on the Skin: A Systematic Review," *Advances in Medicine,* 2018 and Om P. Gandhi and Abbas Riazi, "Absorption of Millimeter Waves by Human Beings and Its Biological Implications," *IEEE Transactions on Microwave Theory and Techniques,* vol. 34, no. 2, 1986.

Figure 1:
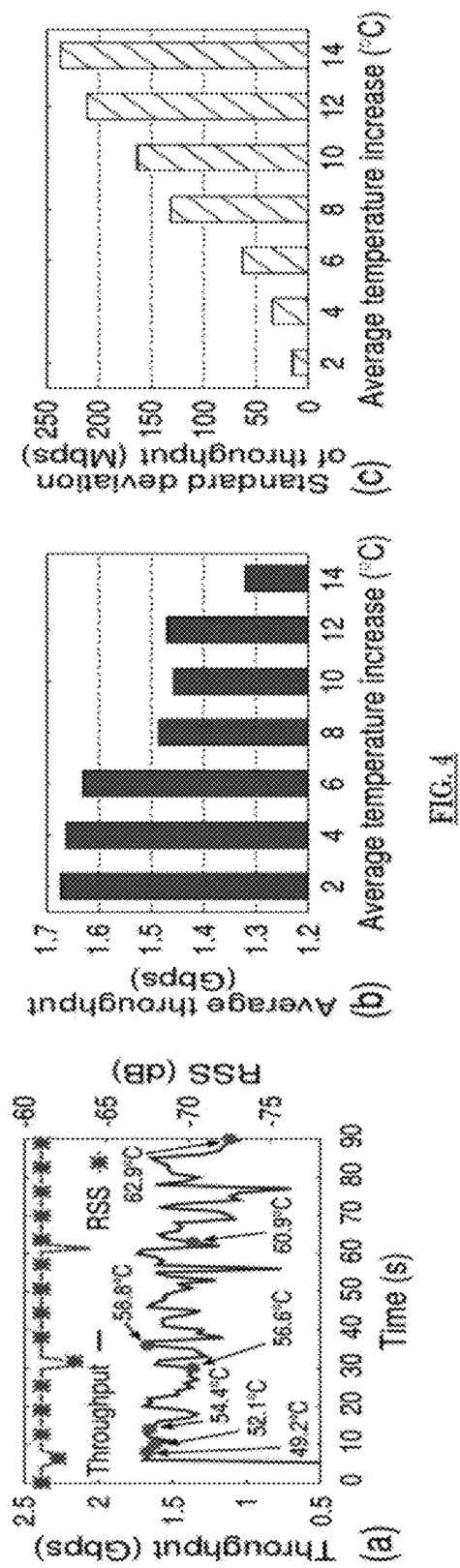
FIG. 1 shows at: (a) a VR device with 4 mmWave antennas connected to the access point (AP) via antenna 1; data transfer increases its temperature; (b) scheduler switches to relatively cooler antenna 2 with the best link to the AP; (c) signal strength of the best beam from the 4 antennas; (d) dimensions of a 60 GHz mmWave antenna.

Driven by the measurement insights, we propose AQUILO[1]—a temperature-aware multi-antenna scheduler that cools down mm Wave devices substantially. AQUILO's key idea is intuitive: Before one antenna heats up excessively, its data stream may be switched or distributed to other redundant antennas, allowing it to dissipate the heat. Equipping a mmWave system, like 5G smartphone or VR, with multiple antennas not only is a reasonable system choice, but also is necessary to provide reliable connectivity under channel fluctuations and Obstructions. See, Qualcomm Incorporated, "Breaking the Wireless Barriers to Mobilize 5G NR mmWave," 2019. [Online]. Available: https://www.qualcomm.com/media/documents/files/5g-nrmmwave-deployment-strategy-presentation.pdf and "5G mmWave Radio Design for Mobile," 2017. [Online]. Available: shorturl.at/bfiFG. Coordination among these multiple antennas proactively reduces the overall temperature. This idea draws inspiration from the existing thermal mitigation techniques in multi-processor architectures. See, D. Brooks and M. Martonosi, "Dynamic Thermal Management for High-Performance Microprocessors," in *International Symposium of High-Performance Computer Architecture (HPCA),* 2001, K. Skadron, "Hybrid Architectural Dynamic Thermal Management," in *IEEE Proceedings Design, Automation and Test in Europe Conference and Exhibition,* 2004, A. Kumar and L. Shang and L-S. Peh and N. K. Jha, "System-Level Dynamic Thermal Management for High-Performance Microprocessors," *IEEE Transactions of Computer-Aided Design of Integrated Circuits and Systems,* vol. 27, 2008, A. Merkel and F. Bellosa and A. Weissel, "Event-Driven Thermal Management in SMP Systems," in *Workshop on Temperature-Aware Computer Systems,* 2005, and H. Jung and M. Pedram, "Stochastic Dynamic Thermal Management: A Markovian Decision-Based Approach," in *International Conference of Computer Design,* 2007. Yet, the challenges are in the variable thermal behavior and variable connectivity of the mmWave antennas. We propose a smart, adaptive multi-antenna scheduling technique that exploits the near-past observation of the thermal profiles, and probe and switch scheme to maintain relatively stable throughput performance and reduce the overall device temperature. FIG. 1 shows the core idea behind AQUILO: (a) VR device with 4 mmWave antennas connected to the access point (AP) via antenna 1; data transfer increases its temperature; (b) Scheduler switches to relatively cooler antenna 2 with the best link to the AP; (c) Signal strength of the best beam from the 4 antennas; (d) Dimensions of a 60 GHz mmWave antenna.

[1]Aquilo was the Roman god of cold north wind and bringer of winter.

We have validated AQUILO on a 60 GHz mobile mmWave testbed; it consists of a NETGEAR X10 Access Point (AP) [NETGEAR, Inc., "Nighthawk X10 Smart WiFi Router," 2017. [Online]. Available: https://www.netgear.com/landings/ad7200/] and ASUS ROG smartphones [AsusTek Computer Inc., "ASUS ROG Phone," 2018. [Online]. Available: https://www.asus.com/us/Phone/ROG-Phone/]. Both the AP and smartphones are IEEE 802.11ad standard-compliant; also, ASUS ROG is the only commercially available 60 GHz smartphone, currently. Since the COTS smartphone is equipped with one mmWave antenna only, we collect real device throughput and temperature profiles, but use trace-based methods to emulate a multi-antenna device. Our testbed experiments demonstrate that, in comparison to a throughput-only maximization scheduling, AQUILO can effectively reduce the median peak temperature by 12° C. and 9.5° C., under static and mobile conditions, respectively. While these improvements come from sacrificing 9.8% (static) and 8.5% (mobile) of throughput, AQUILO is still able to support at least 1.4 Gbps throughput at all times in static and 1.03 Gbps in more than half of the mobile cases. Furthermore, our field trials with traces collected from two applications, FTP and VR, show that AQUILO satisfies the minimum throughput requirements while simultaneously achieving the near-optimal device temperatures.

In summary, we have two main contributions: (1) Thermal Characterization of 60 GHz mmWave Device: To the best of our knowledge, we are the first to perform a systematic study of the effects of mm Wave device states and link performance on the device's temperature and the effect of temperature on the device's performance; and (2) Temperature-Aware Multi-Antenna Scheduler: Based on the insights from our thermal characterization, we propose, design, and validate a temperature-aware multi-antenna scheduler and demonstrate its effectiveness in maintaining the link performance while reducing the temperature substantially.

MmWave Devices and Standards

MmWave devices operate at a very high frequency and ultra-wide bandwidth, in the order of multiple GHz. Currently, there are two most popular mmWave standards: 5G NR (frequency ranges are 26.5-29.5 GHz and 37.0-40.0 GHz); and IEEE 802.11ad [1] (57-71 GHz). Specifically, IEEE 802.11ad devices operate on the unlicensed 60 GHz mmWave, use 2.16 GHz bandwidth, and can achieve peak bit-rate up to 7 Gbps. Since mmWave channel suffers from high signal propagation loss, both the standards use phased-array antenna and directional beam for signal strength compensation. Due to the small form factor of mmWave radio-frequency (RF) components and elements, multiple antennas can be integrated into mobile devices; besides, multiple antennas provide reliable connectivity under channel fluctuations and obstructions.

While existing research works have extensively characterized mmWave channel, link, network, and applications, AQUILO is the first to characterize the thermal profile of mm Wave antennas, and design, evaluate, and demonstrate a temperature-aware multi-antenna scheduling scheme. AQUILO is complementary to the existing mmWave systems' research and can benefit from their reliable connectivity and improved performance.

Thermal Mitigation Techniques

AQUILO is partly inspired by the thermal mitigation techniques in multi-CPU systems. Several proposed approaches can reduce the temperature significantly: dynamic trigger, see D. Brooks and M. Martonosi, "Dynamic Thermal Management for High-Performance Microprocessors," in *International Symposium of High-Performance Computer Architecture* (HPCA), 2001 and X. Zhou, J. Yang, M. Chrobak, and Y. Zhang, "Performance-Aware Thermal Management via Task Scheduling," *ACM Transactions on Architecture and Code Optimization*, vol. 7, no. 1, 2010, M. Chrobak, C. Drr, M. Hurand, and J. Robert, "Algorithms for Temperature-Aware Task Scheduling in Microprocessor Systems," *Springer Publications*, vol. 5034, 2008; hybridized thermal stress-aware adaptation, see K. Skadron, "Hybrid Architectural Dynamic Thermal Management," in *IEEE Proceedings Design, Automation and Test in Europe Conference and Exhibition*, 2004; priority queueing, see A. Kumar and L. Shang and L-S. Peh and N. K. Jha, "System-Level Dynamic Thermal Management for High-Performance Microprocessors," *IEEE Transactions of Computer-Aided Design of Integrated Circuits and Systems*, vol. 27, 2008; passive load balancing and active migration A. Merkel and F. Bellosa and A. Weissel, "Event-Driven Thermal Management in SMP Systems," in Workshop on Temperature-Aware Computer Systems, 2005; and stochastic techniques H. Jung and M. Pedram, "Stochastic Dynamic Thermal Management: A Markovian Decision-Based Approach," in *International Conference of Computer Design*, 2007. Yet, AQUILO faces two challenges that are absent in multi-CPU systems: variable thermal behavior; and highly variable and unpredictable connectivity of the mmWave antennas.

While there are existing works in micro-wave systems to minimize the power or energy consumption, see J. Liu and L. Zhong, "Micro Power Management of Active 802.11 Interfaces," in *Proc. of ACM MobiSys*, 2008, G. Anastasi and M. Conti and E. Gregori and A. Passarella, "802.11 Power-Saving Mode for Mobile Computing in Wi-Fi Hotspots: Limitations, Enhancements and Open Issues," *Springer Link Wireless Networks*, vol. 14, no. 6, 2008, E. Rozner, V. Navda, R. Ramjee, and S. Rayanchu, "NAPman: Network-Assisted Power Management for WiFi Devices," in *Proc. of ACM MobiSys*, 2010, K. Flautner, S. Reinhardt, and T. Mudge, "Automatic Performance Setting for Dynamic Voltage Scaling," in *Proc. of ACM MobiCom*, 2001, Xinyu Zhang and Kang G. Shin, "E-MiLi: Energy-Minimizing Idle Listening in Wireless Networks," in *Proc. of ACM MobiCom*, 2011, B. Gao, Z. Xiao, L. Su, D. Jin, and L. Zeng, "Energy-Efficient Idle Listening Scheme using 1 Bit Sampling in 60 GHz Wireless Local Area Network," *IET Communications, vol.* 9, pp. 219-226, 2015.], to the best of our knowledge, none has looked at minimizing the system-level temperature of active mmWave antennas.

Thermal Characterization

In this section, we characterize the impact of device's states and throughput performance on its thermal profiles. First, we investigate the thermal profile of mmWave antenna under a device's idle and active states. Second, we identify performance fluctuations under high antenna temperatures. Finally, we study the trade-off between throughput performance and antenna temperature by inducing bit-rate adjustment and periodic idleness. In all cases, we explain the underlying reason for the observed behavior and how it differs from what may be expected. The findings of this section inform our proposal for temperature-aware multi-antenna scheduler.

Setup

For our experiments, we use commercial mmWave smartphones: ASUS ROG and AP: NETGEAR X10, see FIG. 2 at (a). FIG. 2 shows at (a) millimeter-wave access point (AP) and smartphone; (b) the temperature of the room and the millimeter-wave antenna at idle state as well as the effect of data transfer duration on: (c) mean heat dissipation time; and (d) peak antenna temperature. The devices operate at 60 GHz mmWave and are IEEE 802.11ad compliant. They use a Qualcomm mmWave chipset and operate on a 2.16 GHz bandwidth, support up to 4.62 Gbps bit-rate, and have a 32-elements phased-array antenna. Furthermore, the devices have embedded, a high-resolution temperature sensor that allows us to monitor the antenna's temperature continuously. The smartphones use Android version 8.1 with a Linux kernel, and we can access the temperature data directly from the kernel file: /sys/kernel/debug/ieee80211/phy0/wil6210/temp.

We performed experiments in a temperature-controlled indoor office environment with static mmWave channel conditions.

A. Thermal Profile in Idle and Active States

Profile in Idle State

We start by understanding the impact of the device's idle and active states on the thermal profile. We first measure the temperature when the mmWave antenna is idle, i.e., no data communication with the AP. FIG. 2 at (b) shows that the antenna's average temperature is 48.63° C., about 24° C. higher than the room temperature. This high idle temperature is due to the very high power consumption during idle listening, see Xinyu Zhang and Kang G. Shin, "E-MiLi: Energy-Minimizing Idle Listening in Wireless Networks," in *Proc. of ACM MobiCom*, 2011, the smartphone needs to listen to the incoming mmWave packets and assess the clear channel condition continuously. This also corroborates with the existing measurement that shows the idle listening power consumption in mmWave devices can be up to 1.7 W.

Profile in Active States

Figure 3:
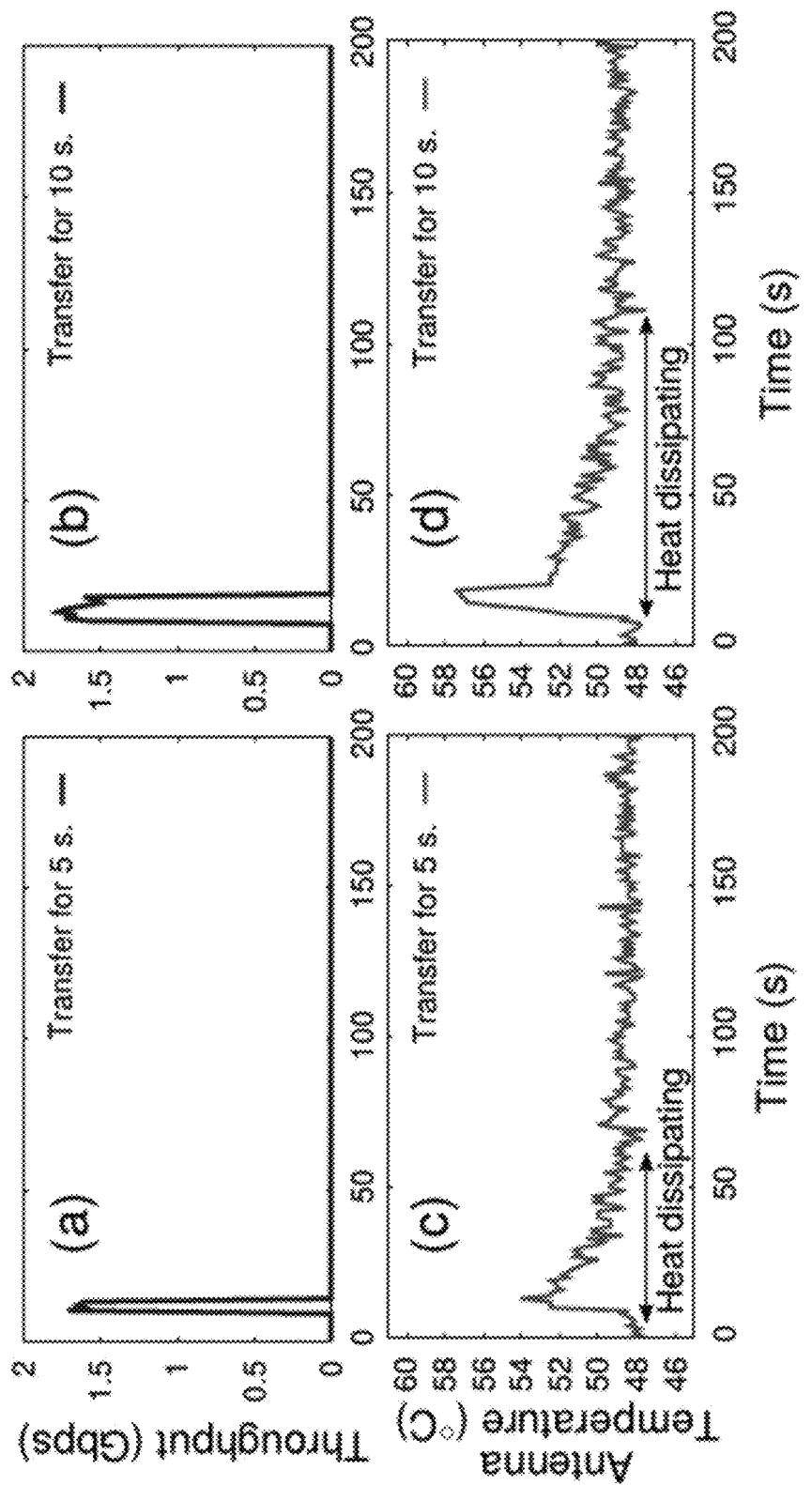
FIG. 3 shows at: (a-b) data transfers for 5 s. and 10 s; and (c-d) antenna temperatures over time and heat dissipation durations.

Active states consume more power, about 2.5 W during data transfer, see Id. Thus, it increases the antenna temperature further. Nonetheless, we expect that, as soon as the data transfer stops, the antenna would cool down and reach its idle temperature quickly. Unfortunately, heat acts just like stored energy in a capacitor—it takes a long time to dissipate, and more the data transfer, longer the heat dissipation time. To understand this effect, we set up the smartphone 1 m. away from the AP and transfer data at a peak rate for a specific duration; the duration varies between 1 s. and 15 s. In parallel, we measure the antenna temperature. FIG. 3 shows at (a-b): data transfers for 5 s. and 10 s.; and at (c-d) antenna temperatures over time and heat dissipation durations. FIG. 3 at (a-d) plot two examples of antenna temperature for 5 s. and 10 s. of data transfers. They show that a 10 s. of transfer requires about 130 s. to dissipate the heat completely.

The dissipation time is measured as the time it takes the antenna to return to its idle temperature. Increase in the transfer duration also increases the dissipation time; our measurements in FIG. 2 at (c) are in agreement. More importantly, the average dissipation time can be up to 20× higher than the transfer duration. These transfer durations are lower than a typical application run-time; moreover, certain applications, like wireless AR/VR streaming, require continuous Gbps data transfer. Besides, higher data transfer duration affects the antenna's peak temperature too; FIG. 2 at (d) shows that the temperature can reach up to 68° C. for only a 10 s. data transfer.

Performance Fluctuations with High Temperature

High antenna temperature can adversely affect the throughput performance too, due to increased thermal noise and leakage current. To quantify this effect, we perform experiments under the previous set up, but change the AP-smartphone distance to 50 cm. First, we transfer data at a peak data rate for 90 s. duration continuously and measure the antenna temperature as it rises. Then, we divide the measurement into several time segments, marking every time index where the temperature increases by approximately 2° C. Finally, we measure the average and standard deviation of the throughput for each time segments. We repeat our experiments 85 times and present the average of the results. Throughout the experiments, we also measure the Received Signal Strength (RSS) by the AP. The standard deviation of the RSS is 0.47 dB only; in other words, the data is transferred at a very stable channel condition. FIG. 4 shows link performance is affected by higher antenna temperature: (a) link RSS is stable, but throughput fluctuates over time; every time index is marked for 2 C temperature increase; for every 2 C increase, we see changes in (b) Average throughput; and (c) Standard deviation of throughput. FIG. 4 at (a) shows an example RSS and throughput profile and marks the time indices for each segments. Even under the stable channel condition, the throughput fluctuates significantly. FIG. 4 at (b-c) plots the average throughput and its standard deviation for every 2° C. rise in temperature, up to 14° C. maximum increase. Clearly, average throughput degrades as the temperature increases; the loss of average throughput at 14° C. increase is 21%. Besides, the standard deviation of the throughput increases by almost 6×, even under stable channel condition; it can reach up to 240 Mbps. Thus, higher antenna temperature not only degrades average performance, but also increases its variations significantly. Since both noise and leakage current degrades signal fidelity, we speculate that the device adapts to it by changing the bitrate. But commodity devices currently do not allow measuring such fine-grained bit-rate adaptation, thermal noise, or leakage current; so, we leave an extensive analysis of the performance fluctuations under high temperature as future work.

Effect of Periodic Idleness and Bit-Rate Adjustment

Inducing Periodic Idleness

A strawman approach to reducing the antenna temperature is to keep it idle in between the data transfers, since an idle period helps the antenna to cool down. To understand this effect, we use the previous experimental set up and run experiments for 270 s. with three transfer modes: continuous for 270 s; periodic for 10 s. followed by idleness for 5 s. (i.e., 66.7% duty cycle); and continuous for 180 s. (66.7% of 270 s.). FIG. 5 shows three data transfer modes: (a) throughput of the millimeter-wave link; (b) temperature profiles of the antenna; and (c) effect of various idle durations on an antenna's peak temperature. See FIG. 5 at (a-b) showing the throughput and temperature profiles. Under continuous 180 s. and 270 s. transfers, the temperatures grow steadily peaking at 75.63° C. and 79.38° C., respectively. After 180 s., when the transfer stops, the antenna starts cooling down; but it never reaches to the idle temperature within 270 s. Introducing a periodic idleness of 5 s. after every 10 s. of transfer reduces the temperature substantially; the peak temperature is below 64° C., for 96% of the time. FIG. 5 at (c) also shows that longer idleness in between transfers can reduce the peak temperature when the transfer durations are short. But this is ineffective for a longer transfer duration. For example, when the data transfer duration is periodic 15 s., none of the idle durations from 3 to 15 s. can reduce the peak temperature below 66° C.

Inducing Bit-Rate Adjustment

Figure 6:
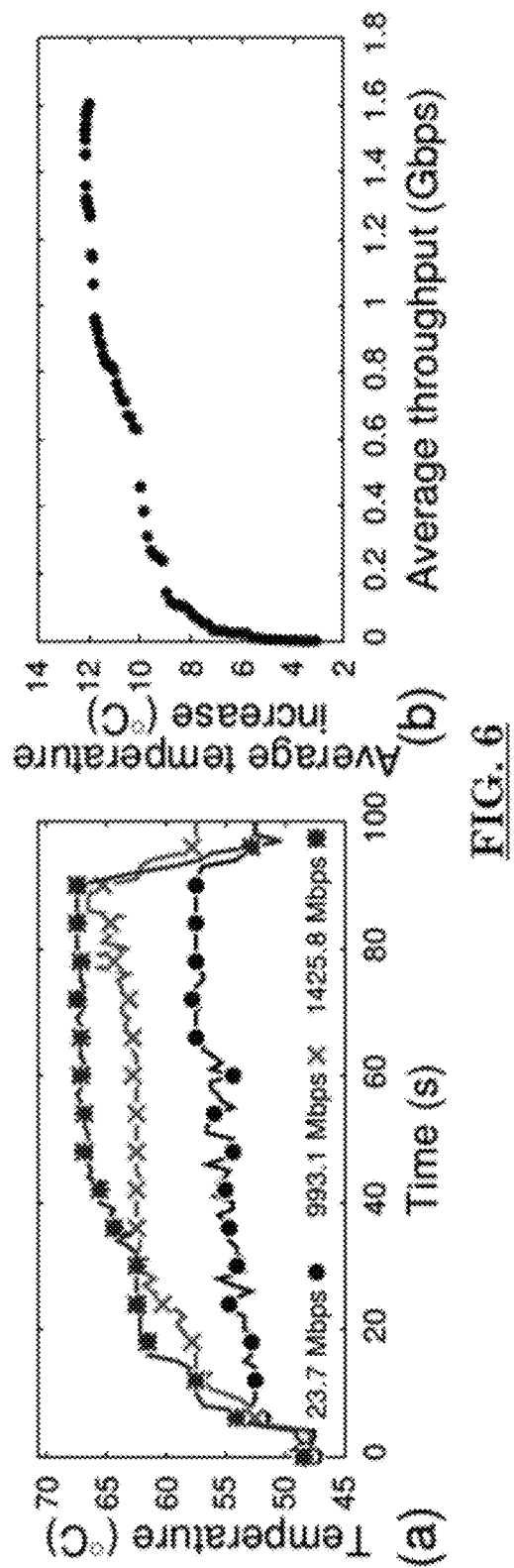
FIG. 6 shows at: (a) temperature profile of 85 s. of data transfer; (b) average temperature increase for different link throughput.

FIG. 6 shows at (a) a temperature profile of 85 s. of data transfer; and (b) average temperature increase for different link throughput. Another approach to reducing the temperature would be to slow down data transfer speed. Intuitively, the device consumes less power to transfer at a lower bit-rate, thus, heats up slowly. This is reflected in FIG. 6 at (a); it illustrates three experiments at different mean throughput-level. For the mean throughputs at 1.4 Gbps, 0.9 Gbps, and 0.024 Gbps, the peak temperatures are at 67.5° C., 63° C., and 56° C., respectively. However, FIG. 6 at (b) shows that the temperature cannot be reduced by changing the throughput-level anywhere from 1.6 to 1 Gbps, hardly 0.17° C.

Furthermore, for certain devices and applications, e.g., wireless

VR/AR, neither increased idle duration nor reduced bit-rate is affordable since they require stringent throughput and latency guarantees; but it may be possible to switch the data stream to another antenna with lower temperature.

Measurements Summary

In summary, we showed the following properties: (1) mmWave device's temperature could be high, even when the device is idle; moreover, a longer data transfer duration not only increases the peak temperature, but also takes significantly longer time for heat dissipation—the dissipation time can be up to 20× higher than the transfer duration: (2) this high device temperature, in turn, affects the link performance: even at static conditions, it reduces the average link throughput by more than 21% and increases the standard deviation of throughput by 6×; and a lower bit-rate can reduce the device temperature, only when the link throughput is below 1 Gbps; more importantly, periodic idleness can help reduce antenna's temperature, but only when the data transfer duration is short.

Aquilo Design

Driven by the measurement insights, we propose AQUILO, a thermal profile based multi-antenna scheduler to maximize the link performance (e.g., throughput) and minimize the antenna temperature. AQUILO enables a mmWave AP and end-user device to select relatively cooler antennas dynamically. While existing works in micro-wave systems may reduce the idle temperature by scheduling sleep periods or reducing ADC bit-rate or clock-rate, to the best of our knowledge, none has looked at minimizing the system-level temperature of active mmWave antennas.

Our key idea stems from the observation that the idle period between data transfers helps the cooling process. Unfortunately, periodic idle durations in a single antenna system are unaffordable for many applications, e.g., wireless VR/AR, real-time streaming, because they require stringent throughput and latency guarantees. Fortunately, upcoming mmWave systems, like 5G NR smartphones and VR/AR devices, are being equipped with multiple antennas. It is not only a reasonable system choice, but also necessary to provide reliable connectivity. AQUILO leverages the presence of and coordination among these multiple antennas to reduce the overall system's temperature. However, the objectives of high throughput and low device temperatures are perennially in conflict. So, a key networking challenge we aim to solve is providing an uncompromised quality of throughput and latency experience, while simultaneously maintaining a near-optimal system's temperature. To this end, we design a multi-antenna, online thermal-profile driven, look-ahead network scheduler.

Multi-Antenna Coordination

At a high level, before one antenna heats up excessively, its data stream may be switched to the other antennas, allowing it to dissipate heat. This idea is partly inspired by the thermal mitigation techniques in multi-CPU systems. But there exist significant differences between CPU's and a mmWave antenna's working principle. First, while any one of the CPUs can be turned on and expected to work, such an assumption is invalid for the mmWave antennas; this is because channel fluctuations and antenna obstructions may not allow for a link establishment.

Second, the thermal behavior of the antenna quickly changes depending on the link performance and user's handling of the device, in addition to device insulations and surrounding temperatures. So, multi-antenna coordination techniques will need to consider at least two mmWave issues not present in current thermal mitigation techniques: (1) variable thermal behavior; and (2) highly variable and unpredictable connectivity.

To address these two issues, we propose to use an online thermal profile estimation based look-ahead scheduling among multiple mmWave antennas. The key idea is intuitive.

Data transfer from an antenna increases its temperature while idleness decreases it. Furthermore, the increase and decrease rates depend on the amount and duration of transferred data. Thus, if we could somehow predict an antenna's temperature when they are transferring data at a future point in time, we would be able to schedule a set of antennas such that the peak temperature is minimized and certain performance criterion met. Unfortunately, the temperature increase and decrease rates are not always deterministic; besides, it is difficult to predict mmWave link performance ahead of time because of highly variable connectivity. AQUILO leverages near-past observations of the thermal profile for the temperature prediction and a look-ahead schedule and probe scheme for antenna selection. Next, we describe these design components in detail.

Thermal Profile Estimation

Issues with a Fixed Thermal Profile Model

A natural way to predict an antenna's future temperature would be to use a fixed temperature rise and fall model. Intuitively, the model parameters depend on the data transfer rate and duration; and, based on several measurements, we could extract the parameters and use them during the run-time. Unfortunately, the model itself varies depending on several factors: device types; insulation materials, locations, and amount; surrounding temperature; and the user's handling of the device. To understand the model variations, we measure the thermal profile using the AP-smartphone set up under two environments: indoor office and home. We set up the smartphone 50 cm. away from the AP and transfer data at a peak rate for 10 s. continuously, ensuring that the channel is stable and the average throughput is around 1.6 Gbps under both the environments.

FIG. 7 shows data transfer for 10 s., and then, heat dissipation: (a) at office; (b) at home; and (c) AQUILO schedules antennas at the beginning of every frame $\mathcal{F}_i$; then, probes and switches to a new antenna every slot Sk. FIG. 7 at (a-b) shows the resulting thermal profiles under the two environments. Clearly, they differ significantly in terms of three parameters: peak temperature; heat dissipation time; and noise. Thus, a fixed temperature rise and fall model established from premeasured dataset will not be generalizable.

Online Profile Estimation

Instead of relying on a fixed model, AQUILO leverages online measurements from near-past time, by recording the temperature of the antennas when they are active or idle. But from our observation in FIG. 3 and FIG. 7 at (a-b), clearly, we need to model the active and idle states separately; this is because switching an antenna from active to idle state stops increasing and starts decreasing the temperature immediately, creating a stark discontinuity in the thermal profile. Thus, the thermal profile of a mmWave antenna can be modeled as two exponentials: exponential gain, $e^{\alpha \cdot t}$, in the active state; and exponential fall, $e^{-\beta \cdot t}$, in the idle state. Furthermore, we can estimate the $\alpha$ and $\beta$ parameters from the near-past temperature observations. Despite this discontinuity, these separate models serve us better in estimating the thermal profiles accurately; the average root mean square error for model fit across all our measured thermal profiles is only 0.52° C. FIG. 7 at (a-b) also shows two such fitting results over the raw measurements. Unfortunately, such raw data is unavailable when the device boots up, or the antenna wakes up for the first time. In such cases, AQUILO can randomly select and switch between antennas to bootstrap the thermal profiles. Note that, such random selection and switch happen only once per antenna since when an antenna starts data transfer, we can measure its thermal profile immediately.

Look-Ahead Schedule, Antenna Probe and Switch
Peak Temperature Based Schedule

AQUILO leverages the estimated thermal profiles to find a list of antenna schedules. Intuitively, the profile indicates the likelihood and change of an antenna's temperature when it is assigned for data transfer at a future point in time. So, under each schedule, the antennas will go through a temperature transformation, and thus, would reach a different peak temperature potentially. Therefore, we can pre-compute the peak temperature attained by each schedule and select the one with the lowest peak. Selecting a schedule with lowest peak temperature also ensures that there is no possibility of a significant temperature differential, i.e., one antenna heating up too high while the others are remaining at idle states. Let us consider a simple example to illustrate this point. Assume we have a 3 antenna system; each antenna is initially at idle temperature, 48° C. We would like to schedule antennas every 1 s. interval; therefore, for a total of 3 s., there are 27 ($3^3$) possible schedules: (1, 1, 1); (1, 1, 2); . . . ; (1, 2, 3); . . . ; (3, 3, 3). Furthermore, let us assume that each antenna's temperature increases by 2° C. every 1 s. when they are scheduled and transfer data. Hence, we can pre-compute the peak temperature of the schedules: (1, 1, 1)→54° C.; (1, 1, 2)→52° C.; . . . ; (1, 2, 3)→50° C.; . . . ; (3, 3, 3)→54° C. Clearly, schedule (1, 2, 3) has the lowest peak temperature; thus, AQUILO will choose it for future data transfer.

Unpredictable Connectivity

The above simple example assumes that there is an equal likelihood of selecting any one of the three antennas. In mmWave, however, the connectivity is highly variable and unpredictable: channel fluctuations and rampant obstructions from the user's hand, body, and various environmental objects may block one or many antennas. Thus, the antennas may not have a strong enough link or sustain an application's performance requirement. To overcome this challenge, AQUILO proposes an antenna probing scheme before selecting and switching to it. First, AQUILO sorts the list of potential schedules as per the likelihood of the lowest peak temperature and then selects the first choice; but there is no guarantee on the first antenna's performance in the selection. Next, AQUILO invokes a fast beam alignment protocol to probe for link strength towards the AP, and using an effective SNR metric, see Daniel Halperin and Wenjun Hu and Anmol Sheth and David Wetherall, "Predictable 802.11 Packet Delivery from Wireless Channel Measurements," in *ACM SIGCOMM*, 2010, converts the strength to throughput performance. Finally, AQUILO switches to the new mmWave antenna that satisfies the expected performance requirement of the application.

Since the first selection may not have sufficient link strength, AQUILO iterates through the list of sorted schedules to eliminate the ones beginning with the antenna without the link. It, then, selects the first antenna from the resulting list, which ensures a good quality link as well as a lower peak temperature. Still, there could be scenarios where no antennas in the selected schedule have any link towards the AP. In such cases, AQUILO falls back to the currently active antenna to at least guarantee connectivity. Furthermore, antenna probing and switching take a relatively small amount of time with state-of-the-art beam alignment protocols (less than 0.5 ms.; thus, the latency overhead from AQUILO will be very low.

Practical Considerations

Ideally, AQUILO should estimate the thermal profiles, sort the list of schedules, and probe and switch to a new mmWave antenna continuously. However, such continuous operations will not only be computationally expensive, but also incur high probing and switching overheads. For practical considerations, AQUILO, thus, operates in a chunk of discrete-time, which we call a frame $\mathcal{F}$. At the beginning of $i^{th}$ frame, $\mathcal{F}_i$, based on the past frame's thermal profile estimations, AQUILO predicts the temperature of each of the antennas as if they are scheduled for data transfer in $\mathcal{F}_i$. Based on the predictions, AQUILO sorts a list of antenna schedules and selects the one with the lowest peak temperature. Each antenna transfers data for a limited time only, which we call a slot s; and, at the beginning of every slot $s_k$, AQUILO probes and switches to the new antenna as per the selected schedule.

In parallel, AQUILO constantly monitors the temperature of both the active and idle antennas, and update a running estimation of their thermal profiles. At the end of $\mathcal{F}_i$, AQUILO uses the newly estimated thermal profiles for scheduling in the next frame, $\mathcal{F}_{i+1}$, and the above process repeats. FIG. 7 at (c) shows an illustrative run-time example of AQUILO.

A key challenge is to identify the suitable lengths for the slot and frame. Intuitively, AQUILO will incur high probing and frequent switching overheads if the slot length is too small. On the other hand, the scheduled antenna will likely change performance within one slot if the length is too large. Besides, slot length and number of slots determine the frame length (slot length X number of slots). A larger frame length means better thermal profiles estimation; but that profile may not be usable for the next frame since the estimation may become stale. This staleness is due to the temporal variations of different factors, such as the surrounding temperature and the location of the user's hand or body. Furthermore, if the frame length is too large with many slots, AQUILO will incur a high computational overhead for thermal profile estimation. For example, if there are 4 mmWave antennas and 5 slots per frame, then the number of possible schedules is 1,024; with only 8 slots per frame, it increases to 65,536.

Non-Adjacency Criteria

One way AQUILO reduces this huge list of schedules is by leveraging a simple heuristic: Avoid scheduling the same antenna in back-to-back time slots. We call it a Non-Adjacency Criteria. Intuitively, the peak temperature attained by a schedule where the same antenna is never scheduled back-to-back is always lower than any other schedule; this is because an antenna starts to cool down immediately after it stops transferring data. This heuristic can reduce the number of schedules exponentially. In the previous example, the number of schedules with Non-Adjacency Criteria is 8,748, an almost 8 reduction from 65,536. We have also verified the performance of this heuristic empirically in reducing the peak temperature.

Example Schedule and Performance

FIG. 8 shows example results for a near-static 90 s. of data transfer under AQUILO and throughput optimization: (a) scheduled antenna numbers; (b) system's through-put; and (c-d) temperature changes over time. FIG. 8 at (a-d) show example output of antenna schedule, system's throughput, and system's peak temperature under AQUILO, and contrast the results with a throughput maximization scheme. We set up our smartphone at 1 m. away from the AP and transfer data at a peak rate continuously for 90 s.; the channel remains in a near-static condition. We simulated a 4 antenna mmWave system with slot length 10 s. and frame length 90 s. For visual clarity, we averaged the system's throughput and temperature every 10 s. window. Peak temperatures under throughput optimization and AQUILO are 71.85° C.

and 55.20° C., respectively. FIG. 8 at (a-b) show the scheduled antenna numbers and the corresponding throughput under the two schemes. Clearly, throughput optimization achieves better throughput; it's about 120 Mbps higher than AQUILO on average (i.e., AQUILO suffers approximately 6% loss). However, the throughput optimization scheme suffers from a very high system's temperature since it only selects two out of four antennas with the best throughput; its peak temperature reaches 71.85° C. AQUILO, on the other hand, selects the antenna for data transfer to minimize the system's temperature. The peak temperature never crosses beyond 55.20° C.—i.e., 16.65° C. temperature reduction sacrificing only 6% average throughput.

Algorithm for Multi-Antenna Scheduling

Algorithm 1, see FIG. 13, formally describes the antenna scheduling process in AQUILO. At the beginning of every frame $\mathcal{F}_i$, AQUILO gathers the thermal profile for all antennas scheduled in frame $\mathcal{F}_{i+1}$; hence, for each schedules $s_j$, it can pre-compute the peak temperature and create a list of sorted schedules, S. AQUILO, then probes the first antenna from the first schedule in the sorted list. Since under variable connectivity, this antenna may fail to establish a link, AQUILO continuously probes the other antennas in the first schedule, removes the unusable antennas, and updates the list of schedules. Once AQUILO is able to establish a link, it starts the data transfer, adapting its beam direction and bitrate, and updating its thermal profiles. Finally, after AQUILO completes every slot scheduled in the current frame, it uses the new thermal profile estimation in the next frame, $\mathcal{F}_{i+1}$.

Latency for Antenna Probing and Switching

Since at the beginning of every slot AQUILO probes the selected antenna, it may incur additional latency; this is because, during the antenna probe, no useful data transfer occurs. For a small-sized antenna, with 64 beams, this latency is 2.02 ms. In IEEE 802.11ad; for a large-sized antenna, this latency can be on the order of 100s of ms. In that case, we can use state-of-the-art fast beam alignment protocols to keep the latency below sub-ms. H. Hassanieh, O. Abari, M. Rodriguez, M. Abdelghany, D. Katabi, and P. Indyk, "Fast Millimeter Wave Beam Alignment," in *Proc. of ACM SIGCOMM*, 2018 and S. Sur, I. Pefkianakis, X. Zhang, and K.-H. Kim, "Towards Scalable and Ubiquitous Millimeter-Wave Wireless Networks," in *Proc. of ACM MobiCom*, 2018. Nonetheless, AQUILO minimizes the overall temperature by switching to a new mmWave antenna, and thus, the number of switches and total latency may be higher than other "temperature unaware" schemes. However, the slot length in AQUILO is much longer than beam alignment latency; therefore, the relative overhead is very low. Next-generation mmWave standards also use multiple RF chains so that many antennas can be active simultaneously and operate independently, see C. Kim, T. Kim, and J.-Y. Seol, "Multi-Beam Transmission Diversity with Hybrid Beamforming for MIMO-OFDM Systems," in *IEEE Globecom Workshops*, Atlanta, GA, 2013. (An RF chain consists of amplifiers, modulators, filters, PLLs, ADC/DACs, etc., and processes the wireless signal.) In such cases, AQUILO can continue data transfer with the active antenna, while simultaneously probing and preparing to switch to another antenna, incurring no additional latency. We have also evaluated the effect of antenna switching on AQUILO's network delay performance.

Integrating AQUILO with IEEE 802.11Ad and 5G NR

AQUILO can be integrated with IEEE 802.11ad/ay or 5G NR COTS devices seamlessly. At a high level, AQUILO's slots and frames span multiple beacon intervals in IEEE 802.11ad (100 ms.) or multiple radio frames in 5G NR (10 ms.). For example, if the slot and frame lengths are 1 s. and 5 s., then one slot and frame span 10 and 50 beacon intervals, respectively, in IEEE 802.11ad. Throughout a beacon interval or a radio frame duration, AQUILO can follow the standard protocols to aligning the beam directions and transferring data with the active antenna. At the beginning of each slot, instead of initiating a beam alignment from the current antenna per the standard, AQUILO initiates the probing and switches to the appropriate antenna as per its schedule. Since this probe and switch happens after every slot, that spans several beacon intervals, the relative cost is very low. Besides, in the future, AQUILO can be integrated into the standard devices to provide device temperature as a Quality of Service, by enabling flexible guarantees on the peak temperature of the mmWave devices.

Implementation

The current disclosure implemented and evaluated AQUILO by collecting throughput and temperature measurements from a COTS testbed, see FIG. 2 at (a). The mmWave antenna on both the AP and smartphone can generate up to 64 transmit and receive beams in 3D. Under a multi-antenna device, each antenna can generate its own set of 64 beams; so when AQUILO switches to a new antenna, it selects the antenna's beam with the strongest link to the AP. Under mobility and blockage, AQUILO steers the selected antenna's beam to support reliable connectivity. Both the AP and smartphones can measure the wireless bit-rate, link throughput, and temperature of its mmWave antenna every 1s. Throughout our evaluation, we consider IEEE 802.11ad as the underlying standard, and follow its beacon structures, beam alignment process, and antenna switching overheads. We collected measurements for various data transfer periods ranging from 5 to 100 s. Between two measurements, the set up was allowed to cool down to its idle temperature so that all measurements have a common baseline. To expedite the cooling process, we also used an external USB fan.

Since the COTS devices currently do not have multiple mmWave antennas, we ran trace-driven simulations. First, for each experiment, we collect measurements by fixing the smartphone's orientation. Then, we rotate it to 4 different orientations w.r.t. the AP to create antenna's different positions. Finally, we combined the measurements to emulate a setup with 4 mmWave antennas. However, a challenge with this emulation is that it does not capture the effects of the user's device handling, where she may obstruct one or many mmWave antennas occasionally. To simulate these effects, we introduce random blockage as a probability of antenna producing zero throughputs; furthermore, we vary this probability to simulate the different intensity of obstructions.

Evaluation

In this section, we evaluate AQUILO's ability to identify the temperature-optimal antenna scheduling. We consider AQUILO's performance along two dimensions: system throughput; and peak temperature. We will show the following in our evaluation: (1) AQUILO reaches a median peak temperature just 1° C. above the best case while sacrificing 9.8% of throughput under various static conditions; (2) under various degrees of obstructions, AQUILO can approximate the temperature-optimal scheme, with 1.1 to 5.4° C. differences, while maintaining above 1.77 Gbps in more than half of the cases; (3) while AQUILO needs to trade-off temperature-optimal antennas under higher link throughput requirements, it still outperforms simple heuristic-based scheme by 3.9 to 7.4° C.; (4) a larger frame length has poorer performance and higher computational burden, and a smaller slot length has higher probing and switching overheads; in practice, 1 s. slot and 10 s. frames perform well; (5) under mobility, AQUILO shows near-optimal thermal performance, with just 0.5 C median difference from the optimal, even when the link demands 1 Gbps throughput; (6) finally, for two field trial applications, FTP and VR, AQUILO provides a similar quality of experience as the best throughput scheme while reaching near-optimal temperature.

Compared Schemes

We compare AQUILO with the following four schemes:

Best Case Temperature

An "oracle" scheme that finds out the minimum temperature of the system under an experimental condition, considering all possible blockage conditions, temperature changes, and antenna performance ahead of time but after the fact. Although an impractical scheme, this estimates the lower bound on the peak temperature.

Random Scheduling with Non-Adjacency Criteria

The simplest way to schedule is to randomly select an antenna, ensure that it meets the performance requirement, and start data transfer. Since switching an antenna from active to idle state reduces its temperature immediately, we consider a random selection, but ensure that the same antenna is never assigned in adjacent time slots. It allows shuffling between antennas so that the peak temperature does not grow steadily.

Random Scheduling

This scheme selects antennas randomly, but without the non-adjacency criteria, and ensure they meet the application's performance requirement.

Throughput Optimization

It tries to maximize only the throughput, without the knowledge of temperatures. We select by selecting highest throughput schedule. It determines the upper bound of a throughput maximization scheme.

Microbenchmark Results

Performance Under Static Conditions

We first measured AQUILO's effectiveness under static conditions. We choose 200 static links, each with 100 s. duration, and estimate the best case peak temperature. To estimate the ground truth of maximum throughput, we also ran the throughput optimization scheme. In addition, we ran the random scheduling with and without the Non-Adjacency Criteria (NAC). While pure random scheduling captures the average case temperature behavior, random scheduling with NAC evaluates a simple thermal mitigation technique: Allow periodic idleness in an antenna by avoiding adjacent time slots. Finally, we compare the throughput and peak temperature results from AQUILO.

Figure 9:
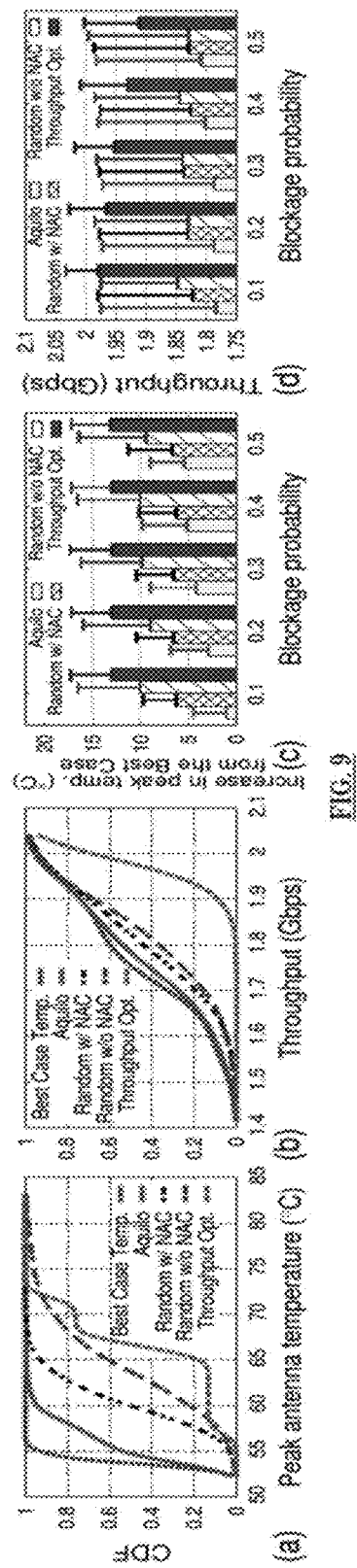
FIG. 9 shows empirical CDF results from different schemes across various static conditions at: (a) peak antenna temperature; and (b) system's throughput; (c) Increase in peak antenna temperatures from the best case; and (d) system's throughput.

FIG. 9 shows empirical CDF results from different schemes across various static conditions: (a) peak antenna temperature; (b) system's throughput-effect of increasing environmental blockage on the performance: (c) increase in peak antenna temperatures from the best case; and (d) system's throughput. The error bar shows $90^{th}$ percentile value. FIG. 9 at (a-b) show the empirical Cumulative Distribution Function (CDF) of the system's peak temperature and throughput. The median of best case peak temperatures is 53.64° C. The throughput optimization shows the worst case temperature performance; its median peak temperature is beyond 67° C., even worse than random scheduling. This is because it only maximizes the throughput and is "temperature-unaware."

Furthermore, a simple heuristic of NAC effectively improves the median peak temperature by more than 3.7° C. from the pure random selection. AQUILO outperforms all the random scheduling and throughput optimization schemes in terms of temperature; its median peak temperature is just about 1° C. above the best case. Compared to the throughput optimization, AQUILO suffers from around 200 Mbps throughput loss (9.8%); but in more than half of the cases, AQUILO reduces the peak temperature by approximately 12° C.

Effect of Environmental Dynamism

Next, we evaluated AQUILO's performance under environmental dynamism that results in varying degrees of antenna blockages. A dynamic environment is the one with moving people, objects around mm Wave link, and user's handling of the mm Wave device, like orientation changes, partial or complete obstructions of one or more mm Wave antennas, etc. We have modeled these events as the varying probability of antenna blockage: For example, if the probability is 0.2, then an antenna can successfully establish a link towards the AP only 80% of the time.

FIG. 9 at (c-d) shows the peak temperature and throughput results with increasing environmental dynamism. Clearly, the temperature performance of AQUILO degrades with increasing blockage probability; under 0.5 probability, the median peak temperature is more than 5° C. above the optimal. This is expected: as the blockage probability increases, AQUILO has limited choices and flexibilities in scheduling antennas with better thermal mitigation, and thus, resort to whatever is available for continued operation. While this is a significant drop in the performance, such high blockage conditions are rare occurrences in practice and limited to a short duration.

Figure 10:
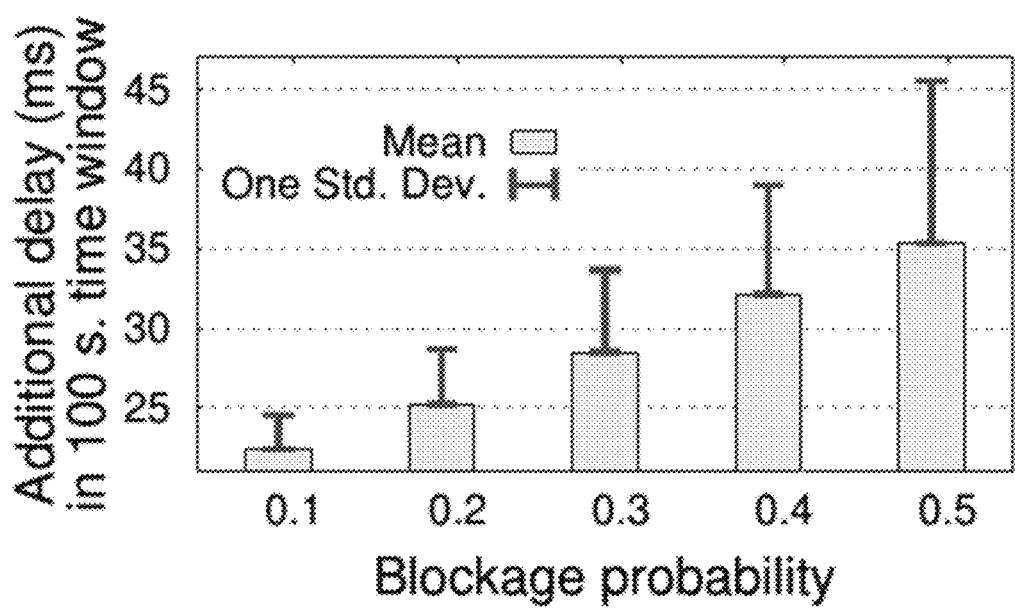
FIG. 10 shows delay under AQUILO within a window of 100 s. under different environmental conditions.

AQUILO may affect the network delay performance too, since it achieves thermal mitigation with antenna probing and switching. To find out the additional latency under AQUILO, we simulated it in a device with 4 antennas, each with 64 beams, in IEEE 802.11ad standard network under various environmental dynamics. We use the standard beam alignment latency, and simulated each blockage configurations for 1000 instances. FIG. 10 shows delay under AQUILO within a window of 100 s. under different environmental conditions. The Error bar shows one standard deviation. The average overhead is less than 0.04%. As expected, the latency increases with higher blockage probability; this is because, under higher blockage probability, AQUILO may need to switch antennas more often, not only for reliable connectivity, but also for better thermal performance. However, even under an intense blockage occurrence with 0.5 probability, the total additional latency, averaged over 1000 instances, is 36.36 ms—this corresponds to an overhead of less than 0.04%.

Performance Under Different Throughput Requirement

Figure 11:
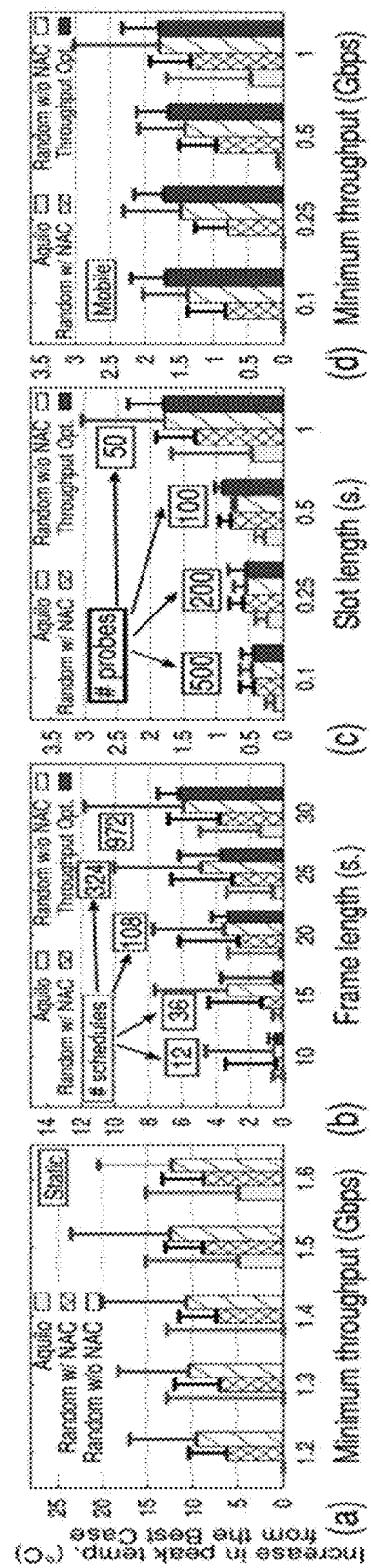
FIG. 11 shows increase in peak temperature under static cases: (a) minimum throughput requirement; (b) frame lengths on peak temperature and #of schedules. Under mobile cases: (c) effect of slot lengths, on peak temperature and #of probes, when min. throughput is 1 Gbps; and (d) effect of minimum throughput, when slot length is 1 s.

FIG. 11 shows increase in peak temperature from the best case. Under static cases, effects of: (a) minimum throughput requirement; and (b) frame lengths on peak temperature and #of schedules. Under mobile cases: (c) effect of slot lengths, on peak temperature and #of probes, when min. throughput is 1 Gbps; and (d) Effect of minimum throughput, when slot length is 1 s. Applications like wireless AR/VR have stringent throughput requirements; to support them, AQUILO may need to tradeoff temperature-optimal antennas for throughput performance. Specifically, Algorithm 1 will be able to schedule only those antennas that guarantee performance at or above the requirements. Thus, intuitively, a higher minimum throughput requirement will degrade the thermal mitigation effectiveness. FIG. 11 at (a) illustrates this point; at higher throughput requirement, AQUILO's performance deviates significantly from the best case and moves closer to random scheduling with NAC.

Effect of Different Frame Lengths

We now evaluate AQUILO's performance in selecting optimal schedules under different frame lengths, but fixed slot lengths. FIG. 11 at (b) shows the difference in median peak temperatures between the best case and AQUILO. We have three observations. First, the effectiveness of AQUILO drops with higher frame length; this is because AQUILO uses past frame's thermal profile estimation to schedule antennas in the next frame, which is more likely to be ineffective if the frame lengths are too large. Second, the number of schedules increases with longer frame duration (shown with boxed numbers in FIG. 11 at (b)), and thus, in practice, AQUILO will have higher computational overhead. Finally, irrespective of the frame length, AQUILO still reaches median peak temperature 2° C. above the optimal.

Performance Under Mobility

We now evaluate AQUILO's performance under mobility. We collect the trace data for various mobility durations between 10 to 50 s., and measure the difference in peak temperatures between the best case and AQUILO. We consider two factors in our mobility evaluation: variable slot length; and variable minimum throughput requirement. FIG. 11 at (c) shows that the effectiveness of AQUILO increases with smaller slot lengths. This is intuitive: a smaller slot length, such as 0.1 s., allows fast switching between antennas and more frequent schedule updates. However, the total number of probings will be very high (shown with boxed numbers in FIG. 11 at (c)). For example, over 50 seconds, with a slot length of 0.1 s., the number of probings will be 500. Such high overhead may not be worth the extra gain in temperature performance. Nonetheless, a slot length of 1 s. enables reasonable thermal mitigation; and, the median peak temperature is only 0.5° C. above the optimal.

FIG. 11 at (d) shows the effect of the minimum throughput requirement of mobile links on AQUILO. AQUILO achieves near-optimal performance when the requirement is at or below 0.5 Gbps; however, the performance deviates from the optimal, under more stringent 1 Gbps requirement. The performance is also relatively poor compared to the static cases (FIG. 11 at (a)). This is expected: under mobility, AQUILO needs to trade-off temperature-optimal antennas for performance more often than static cases. Still, the median peak temperature is only 0.5° C. above the best case, even with 1 Gbps throughput requirement.

Field Trials

Finally, we evaluated AQUILO on real applications; we used the previous mobility set up and collected temperature and throughput trace data while running two applications: FTP; and Virtual Reality (VR) gaming. First, we set up an FTP server on the AP, and the smartphone downloaded a 2 GB file. Then, we set up a gaming server on a PC, see SUSTeK Computer Inc., "ASUS ROG: Command and Control: how to set up your own gaming server," https://rog.asus.com/articles/gaming/command-and-control-how-toset-up-your-own-gaming-server/, 2016, that streams real-time data (video, voice, control) over the smartphone via the 60 GHz mmWave link; we also used a Google cardboard, see Google, "Google Cardboard," https://arvr.google.com/cardboard/, 2020, to set up a smartphone VR. However, all our field trials are limited to 1 Gbps maximum throughput, since the Ethernet port on the PC does not allow for more.

Figure 12:
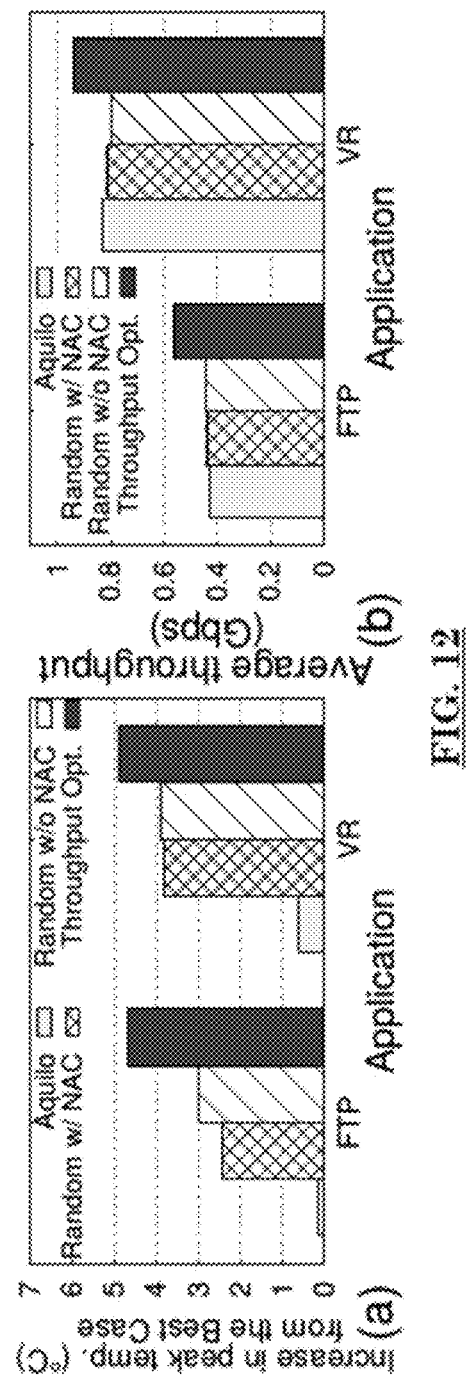
FIG. 12 shows performance in field trial applications: (a) system's peak temperature; and (b) application's throughput.

FIG. 12 shows performance in field trial applications: (a) the system's peak temperature; and (b) Application's throughput. FIG. 12 at (a-b) show the average throughput and peak temperature performance. For both the applications, AQUILO maintains the required throughput performance while reducing median peak temperature within 0.75° C. above the best case. In summary, AQUILO provides a similar quality of experience as the best throughput scheme, while simultaneously reaching near-optimal device temperature.

CONCLUSION

The current disclosure provides a first-of-a-kind study on mmWave thermal characterization and reveals new challenges and opportunities to keep IEEE 802.11ad and 5G NR devices cool. Based on the measurement insights, we propose AQUILO, the first temperature-aware multi-antenna scheduler at mmWave. We used testbed experiments from COTS mmWave devices to demonstrate AQUILO's effectiveness in maintaining link performance while reducing temperature substantially. Overall, we believe, our research on mmWave device cooling helps allay concerns in some quarters about health effects of 5G and accelerates its deployment broadly.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A temperature-aware multi-antenna scheduler system comprising:
   at least two antennae capable of receiving a data stream;
   a preset heat level proscribed for each antenna;
   the scheduler switches the data stream from a first antenna to another antenna, when the first antenna reaches the preset heat level;
   wherein when the data stream is removed from the first antenna, the first antenna dissipates heat;
   wherein a thermal-profile is established for each antennae;
   wherein the thermal-profile of each antenna is modeled as two exponentials: exponential gain, $e^{\alpha \cdot t}$, in an active state; and exponential fall, $e^{-\beta \cdot t}$, in an idle state; and
   wherein the temperature-aware multi-antenna scheduler system is incorporated into at least one mm Wave device compliant with IEEE 802.11 or at least one 5G New Radio (NR) device.

2. The scheduler of claim 1, wherein the data stream is switched from the another antenna to a subsequent antenna.

3. The schedule of claim 2, wherein switching of the data stream among antennas returns the data stream to the first antenna.

4. The scheduler of claim 1, wherein the scheduler analyzes near-past observation of thermal profiles for the at least two antennae to determine which antenna should receive the data stream upon switching.

5. The scheduler of claim 1, further comprising at least one thermal probe.

6. The scheduler of claim 1, wherein the antennae not receiving the data stream remain idle.

7. The scheduler of claim 1, wherein the thermal profile indicates a change of each antenna's temperature.

8. The scheduler of claim 1, wherein the scheduler invokes a fast beam alignment protocol to select an available antenna to receive the data stream wherein the antenna has an expected performance requirement.

9. The scheduler of claim 1, wherein a non-adjacency criteria is employed so that no antenna is scheduled for back-to-back receipt of the data stream.

10. The scheduler of claim 1, wherein Algorithm 1 determines an antenna scheduling process.

11. The scheduler of claim 1 used in virtual and mixed reality, tactile internet, telesurgery, control for smart infrastructures, and/or autonomous vehicle applications.

12. A method for cooling a mmWave device comprising:
forming a plurality of antennae, each capable of receiving a data stream;
determining when heat in a first antenna reaches a preset heat level;
switching a data stream from the first antenna to a redundant antenna, when the first antenna reaches the preset heat level;
wherein switching the data stream from the first antenna results in the first antenna dissipating heat;
establishing a thermal-profile for each antenna; and
modeling the thermal-profile of each antenna as two exponentials: exponential gain, $e^{\alpha \cdot t}$, in an active state; and exponential fall, $e^{-\beta \cdot t}$, in an idle state; and
and
incorporating the plurality of antennae into at least one mmWave device compliant with IEEE 802.11 or at least one 5G New Radio (NR) device.

13. The method of claim 12, further comprising switching the data stream from another antenna to a subsequent antenna.

14. The method of claim 12, further comprising wherein switching of the data stream among antennas returns the data stream to the first antenna.

15. The method of claim 12, further comprising analyzing near-past observation of thermal profiles for at least two antennae to determine which antenna should receive the data stream upon switching.

16. The method of claim 12, further comprising causing antennae not receiving the data stream to remain idle.

17. The method of claim 12, further comprising predicting via the thermal profile a change of each antenna's temperature.

18. The method of claim 12, further comprising invoking a fast beam alignment protocol to select an available antenna to receive the data stream wherein the antenna has an expected performance requirement.

19. The method of claim 12, further comprising employing a non-adjacency criteria so that no antenna is scheduled for back-to-back receipt of the data stream.

20. The method of claim 12, further comprising determining via Algorithm I an antenna scheduling process.

21. The method of claim 12 applied in virtual and mixed reality, tactile internet, telesurgery, control for smart infrastructures, and/or autonomous vehicle applications.

* * * * *